United States Patent [19]

Matsuoka et al.

[11] Patent Number: 5,475,074
[45] Date of Patent: Dec. 12, 1995

[54] POLYMERIZABLE COMPOSITION, ORGANIC GLASS AND OPHTHALMIC LENS

[75] Inventors: Shingo Matsuoka; Hideki Kazama, both of Shinnanyo; Tadashi Hara, Tokuyama; Tomonori Matsunaga, Tokuyama; Hiroshi Suga, Tokuyama, all of Japan

[73] Assignee: Tokuyama Corporation, Yamaguchi, Japan

[21] Appl. No.: 187,475

[22] Filed: Jan. 28, 1994

[30] Foreign Application Priority Data

Jan. 29, 1993 [JP] Japan ........................ 5-013010

[51] Int. Cl.$^6$ ............ C08F 236/20; C08F 212/34; G02B 1/04
[52] U.S. Cl. ............ 526/336; 351/160 R; 351/160 H; 526/85; 526/224; 526/289; 526/304; 526/305; 526/332; 526/333; 526/338; 526/339; 526/340
[58] Field of Search .................. 526/336, 340; 351/160 R, 160 H

[56] References Cited

U.S. PATENT DOCUMENTS

| | | | |
|---|---|---|---|
| 5,191,061 | 3/1993 | Zanka | 528/376 |
| 5,214,116 | 5/1993 | Matsuoka | 526/286 |

FOREIGN PATENT DOCUMENTS

| | | |
|---|---|---|
| 58-153901 | 9/1983 | Japan. |
| 58-198510 | 11/1983 | Japan. |
| 59-164501 | 9/1984 | Japan. |
| 01300201 | 12/1989 | Japan. |
| 01309002 | 12/1989 | Japan. |
| 2169911 | 7/1986 | United Kingdom. |

OTHER PUBLICATIONS

Tsuchida Satoru, Chemical Abstracts, vol. 113, No. 1, Nov. 12, 1990, abstract No. 173746.
Imai Takateru, Chemical Abstracts, vol. 110, No. 8, Feb. 20, 1989, abstract No. 58839.
Murata Takashige, Chemical Abstracts, vol. No. 109, No. 8, Aug. 22, 1988, abstract No. 56205g.
Derwent Publications Ltd. London, An 88–224283 & JP–A–63 159 414 (Dainippon Ink Chem. KK.), Jul. 2, 1988.

*Primary Examiner*—Fred Zitomer
*Attorney, Agent, or Firm*—Birch, Stewart, Kolasch & Birch

[57] ABSTRACT

A polymerizable composition containing;

(A) 100 parts by weight of a vinylbenzyl compound of the formula (I),

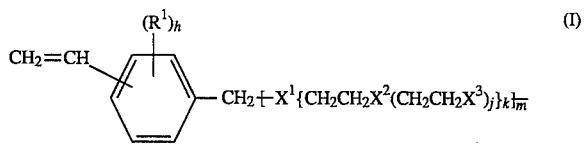
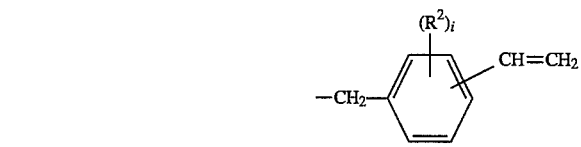

wherein each of $R^1$ and $R^2$ is independently a halogen atom, each of h and i is independently 0, 1 or 2, each of $X^1$, $X^2$ and $X^3$ is independently an oxygen atom or a sulfur atom, and each of j, k and m is 0 or 1, provided that when k is 0, j is 0, that when m is 0, each of j and k is 0, that when j is 0 and when each of k and m is 1, $X^1$ and $X^2$ cannot be sulfur atoms at the same time, and that when each of m, k and j is 1, $X^1$, $X^2$ and $X^3$ cannot be sulfur atoms at the same time, and (B) 0.1 to 20 parts by weight of 2,4-diphenyl-4-methyl-1-pentene.

The polymerizable composition can give a molded article which is free from coloring in heat treatment, has sufficient properties as an ophthalmic lens such as a high refractive index, a high Abbe's number and a low specific gravity, is excellent in transparency, light resistance, heat resistance and impact resistance, and is therefore suitable as an organic glass such as an ophthalmic lens and a lens for an optical device.

22 Claims, No Drawings

POLYMERIZABLE COMPOSITION, ORGANIC GLASS AND OPHTHALMIC LENS

BACKGROUND OF THE INVENTION

1. Field of the Invention

The present invention relates to a transparent polymer, particularly to a polymerizable composition suitable as a raw material for producing an ophthalmic lens. More specifically, it relates to a polymerizable composition suitable for producing a transparent polymer which is free from coloring in the heat treatment carried out for improving the adhesion of a coating agent prior to the application of the coating agent to the transparent polymer and which has sufficient properties as an ophthalmic lens such as a high refractive index, a low specific gravity, dispersibility, light resistance, hardness, dyeability, impact resistance and odorless properties in resin processing. Further, the present invention relates to a polymer formed from the above polymerigable composition, particularly to an organic glass and an ophthalmic lens.

2. Description of the Related Art

Studies have been hitherto made of organic glass, which is expected to substitute inorganic glass. However no satisfactory organic glass has been obtained so far. For example, a polymer obtained by the polymerization of a monomer composed mainly of methyl methacrylate or diethyiene glycol bis(allylcarbonate) is being used as an optical material or lens. However, the refractive index of this polymer is as low as about 1.50.

In recent years, attempts to increase the refractive index, have been made by introducing sulfur into the molecular structure of a polymer. For example, Japanese Laid-open Patent Publication No. 164501/1984 discloses a polymer produced from a distyrene compound containing a sulfide structure. Japanese Laid-open Patent Publications Nos. 300201/1989 and 309002/1989 disclose a polymer produced by the addition polymerization of a vinyl compound and a polythiol compound. The defect with these polymers is that their light resistance is poor.

Further, Japanese Patent Publication No. 51161/1990 discloses organic glass formed of a copolymer produced from the monomer of the following formula,

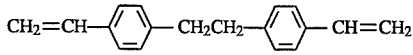

and other monomers polymerizable with the above monomer. The problem with the above organic glass is that when it is heat-treated for improving the adhesion of a coating agent prior to the application of the coating agent, it turns yellowish as a whole.

Further, Japanese Laid-open Patent Publication No. 198510/1983 discloses organic glass formed by the polymerization of a monomer composition comprised of a dimer of α-methyl styrene, i.e., 2,4-diphenyl-4-methyl-1-pentene, methyl methacrylate and ethylene glycol dimethacrylate. Although it is transparent, this organic glass cannot be used as an ophthalmic lens, since it has a low refractive index and is insufficient in properties such as dyeability.

SUMMARY OF THE INVENTION

It is an object of the present invention to provide a polymer which is free from coloring in the heat treatment for a surface coating, has a relatively high refractive index, and has excellent physical properties as an ophthalmic lens.

The present inventors have made diligent studies for achieving the above object, and found that the above object is achieved by a polymer produced from a monomer composition prepared by mixing (A) a vinylbenzyl compound having a specific structure and (B) 2,4-diphenyl-4-methyl-1-pentene.

According to the present invention, therefore, there is provided a polymerizable composition containing;

(A) 100 parts by weight of a vinylbenzyl compound of the formula (I),

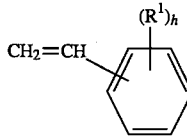—CH$_2$—[X$^1${CH$_2$CH$_2$X$^2$(CH$_2$CH$_2$X$^3$)$_j$}$_k$]$_m$—CH$_2$—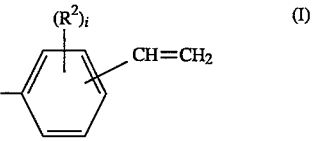   (I)

wherein each of $R^1$ and $R^2$ is independently a halogen atom, each of h and i is independently 0, 1 or 2, each of $X^1$, $X^2$ and $X^3$ is independently an oxygen atom or a sulfur atom, and each of j, k and m is 0 or 1, provided that when k is 0, j is 0, that when m is 0, each of j and k is 0, that when j is 0 and when each of k and m is 1, $X^1$ and $X^2$ cannot be sulfur atoms at the same time, and that when each of m, k and j is 1, $X^1$, $X^2$ and $X^3$ cannot be sulfur atoms at the same time, and (B) 0.1 to 20 parts by weight of 2,4-diphenyl-4-methyl-1-pentene.

According to the present invention, further, there are provided compositions containing other comonomers, polymerization initiators and/or additives in combination with the above (A) and (B) components. Specifically, there are provided the following polymerizable compositions (i) to (vii) which contain the below-specified components in combination with the above (A) and (B) components.

(i) A polymerizable composition which further contains;
(C) 1 to 50 parts by weight of a mercapto compound having at least two mercapto groups in the molecule.

(ii) A polymerizable composition which further contains;
(C) 1 to 50 parts by weight of a mercapto compound having at least two mercapto groups in the molecule, and
(D) 1 to 150 parts by weight of other monomer copolymerizable with the above (A) and (B) components.

(iii) A polymerizable composition which further contains;
(C) 1 to 50 parts by weight of a mercapto compound having at least two mercapto groups in the molecule,
(D) 1 to 150 parts by weight of other monomer copolymerizable with the above (A) and (B) components, and
(E) 0.01 to 10 parts by weight of a polymerization initiator.

(iv) A polymerizable composition which further contains;
(C) 1 to 50 parts by weight of a mercapto compound having at least two mercapto groups in the molecule, (D) 1 to 150 parts by weight of other monomer copolymerizable with the above (A) and (B) components, (E) 0.01 to 10 parts by weight of a polymerization initiator, and (F) 0.005 to 2.0 parts by weight of a hindered phenol compound.

(v) A polymerizable composition which further contains;

(D) 1 to 150 parts by weight of other monomer polymerizable with the above (A) and (B) components.

(vi) A polymerizable composition which further contains;

(D) 1 to 150 parts by weight of other monomer copolymerizable with the above (A) and (B) components, and (E) 0.01 to 10 parts by weight of a polymerization initiator.

(vii) A polymerizable composition which further contains;

(D) 1 to 150 parts by weight of other monomer copolymerizable with the above (A) and (B) components, (E) 0.01 to 10 parts by weight of a polymerization initiator, and (F) 0.005 to 2.0 parts by weight of a hindered phenol compound.

DETAILED DESCRIPTION OF THE INVENTION

The above components constituting the compositions of the present invention will be specifically explained hereinafter.

(1) (A) component

The (A) component used in the polymerizable composition of the present invention is the vinylbenzyl compound of the above formula (1), which has two vinyl groups.

In the formula (1), each of $R^1$ and $R^2$ is independently a halogen atom. The halogen atom includes fluorine, chlorine, bromine and iodine. In view of the refractive index and light resistance of a polymer to be obtained, chlorine or bromine are particularly preferred. Each of h and i is independently 0, 1 or 2, and when h and i are 0, $R^1$ and $R^2$ are hydrogen atoms.

Further, each of $X^1$, $X^2$ and $X^3$ is independently an oxygen atom or a sulfur atom. For obtaining a high refractive index, a sulfur atom is preferred. However, when two or more of $X^1$, $X^2$ and $X^3$ are contained and when all of these X's are sulfur atoms, the polymer obtained by the polymerization of the polymerizable composition is poor in light resistance and generates an offensive odor during cutting and polishing. For this reason, when m=k=i and when j=1, $X^1$ and $X^2$ cannot be sulfur atoms at the same time. When m=k=j=1. $X^1$, $X^2$ and $X^3$ cannot be sulfur atoms at the same time.

In the above formula (1), each of j, k and m is 0 or 1. When k=0, then j=0. When m=0, then k =j=0, and in this case, $-[X^1\{CH_2CH_2X^2(CH_2CH_2X^3)j\}k]_m-$ is a bond.

In the above vinylbenzyl compound, each vinylbenzyl group may be 2-vinylbenzyl, 3-vinylbenzyl or 4-vinylbenzyl group. In the present invention, preferred is a vinylbenzyl compound whose vinylbenzyl groups are 4-vinylbenzyl or a vinylbenzyl compound whose vinylbenzyl groups are 3-vinylbenzyl and 4-vinylbenzyl.

Specific examples of the vinylbenzyl compound of the formula (1) used in the present invention include 1,2-(vinylphenyl)ethane, bis(vinylbenzyl)ether, bis(vinylbenzyl)sulfide, bis(vinylbenzyloxy)ethane, (1-vinylbenzyloxy-2-vinylbenzylthio)ethane, bis(vinylbenzyloxyethyl)ether and bis(vinylbenzyloxyethyl)sulfide.

The above vinylbenzyl compounds may be used alone or in combination.

(2) (B) component

The (B) component used in the polymerizable composition of the present invention is 2,4-diphenyl-4-methyl-1-pentene. The (B) component has the following effects. The polymerizable composition exhibits improved storage stability. The yellowing of a polymer obtained from the polymerizable composition under heat can be prevented. Further, a polymer from the polymerizable composition exhibits improved impact resistance and improved surface smoothness.

In the present invention, the amount of the (B) component per 100 parts by weight of the (A) component is in the range of from 0.1 to 20 parts by weight. When the above amount of the (B) component is less than 0.1 part by weight, undesirably, it is difficult to prevent the yellowing of the polymer under heat, the improvements in impact resistance and surface smoothness are insufficient, and the storage stability of the polymerizable composition is poor. When the above amount of the (B) component exceeds 20 parts by weight, undesirably, the time required for the polymerization increases, and the hardness of a polymer obtained from the polymerizable composition is low. In view of the prevention of yellowing, impact resistance, surface smoothness and hardness, the amount of the (B) component per 100 parts by weight of the (A) component is preferably in the range of from 0.2 to 15 parts by weight.

The polymerizable composition of the present invention can give a polymer having transparency and sufficient properties for use as an ophthalmic lens when the (A) and (B) components are polymerized in the presence of a proper polymerization initiator. Moreover, the use of the (C) to (F) components to be explained below in proper combination with the (A) and (B) components provides compositions which can give polymers having further excellent properties.

(3) (C) component

The mercapto compound as the (C) component used in the present invention is selected from those compounds having at least two mercapto groups in the molecule. Specific examples of the mercapto compound as the (C) component include alkylene thiols such as ethanedithiol, 1,4-butanedithiol, di(2-mercaptoethyl)sulfide, di(2-mercaptoethyl)ether, 1,1-bis(mercaptomethyl)ethanethiol, 1,1-bis(mercaptomethyl)propanethiol and tetrakis(mercaptomethyl)methane; thioglycolate compounds such as ethylene glycol dithioglycolate, propylene glycol dithioglycolate, butandiol dithioglycolate, hexamethylene glycol dithioglycolate, trimethylolethane trithioglycolate, trimethylolpropane trithioglycolate and pentaerythritol tetrakisthioglycolate; and thiopropionate compounds such as ethylene glycol dithiopropionate, propylene glycol dithiopropionate, butanediol dithiopropionate, hexamethylene glycol dithiopropionate, trimethylolethane trithiopropionate, trimethylolpropane trithiopropionate and pentaerythritol tetrakisthiopropionate. These mercapto compounds may be used alone or in combination.

In view of the low degree of offensive odor in cutting a polymer obtained from the polymerizable composition, it is preferred to use a polythioglycolate compound or a polythiopropionate compound obtained by the esterification of an alkylene polyol such as ethylene glycol, propylene glycol, trimethylolethane or pentaerythritol and a mercaptocarboxylic acid such as mercaptoglycolic acid or mercaptopropionic acid. The above compound has the following formula (II-a) or (II-b).

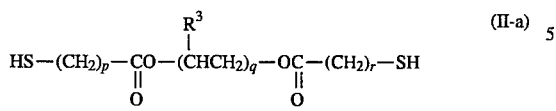

wherein $R^3$ is a hydrogen atom or a methyl group, each of p and r is independently 1 or 2, and q is an integer of 1 to 5, preferably 1 to 3.

$(R^4)_lC$—$[CH_2OOC(CH_2)_pSH]_{4-l}$ (II-b) wherein $R^4$ is a methyl or ethyl group, p is 1 or 2, and l is 0 or 1.

The polymerizable composition containing the above mercapto compound as the (C) component gives a polymer having improved dyeability and improved impact resistance. The amount of the (C) component per 100 parts by weight of the (A) component is in the range of from 1 to 50 parts by weight, preferably 5 to 40 parts by weight. When the above amount of the (C) component exceeds 50 parts by weight, undesirably, the polymer has low hardness and low heat resistance, and the polymer generates offensive odor in polishing.

(4) (D) component

The polymerizable composition of the present invention may contain, as (D) component, other monomers polymerizable with the above (A) and (B) components. The amount of the (D) component per 100 parts by weight of the (A) component is in the range of from 1 to 150 parts by weight, preferably 1 to 130 parts by weight. The (D) component is a compound having a group copolymerizable with the (A) and (B) components by a radical polymerization to be described later. Specifically, the (D) component is a compound having at least one, preferably 1 to 2, vinyl, acryloyl, methacryloyl or allyl group(s) in the molecule.

Examples of the (D) component include (i) unsaturated carboxylic acids such as methacrylic acid, maleic anhydride and fumaric acid; (ii) acrylic acid and methacrylic acid ester compounds such as methyl acrylate, methyl methacrylate, benzyl methacrylate, phenyl methacrylate, 2-hydroxyethyl methacrylate, glycidyl methacrylate, bisphenol A dimethacrylate, 2,2-bis(4-methacryloyloxyethoxyphenyl)propane, 2,2-bis(3,5-dibromo-4-methacryloyloxyethoxyphenyl)propane and trifluoromethyl methacrylate; (iii) thioacrylic acid or thiomethacrylic acid ester compounds such as methyl thiomethacrylate, methyl thioacrylate, phenyl thiomethacrylate and benzyl thiomethacrylate; (iv) fumaric acid ester compounds such as monomethyl fumarate, diethyl fumarate and diphenyl fumarate; (v) allyl compounds such as diallyl phthalate, diallyl terephthalate, diallyl isophthalate, diallyl tartrate, diallyl epoxysuccinate, diallyl maleate, allyl cinnamate, diallyl carbonate and allyldiglycol carbonate; (vi) aromatic vinyl compounds such as styrene, divinylbenzene, chlorostyrene, α-methylstyrene, vinylnaphthalene, isopropenylnaphthalene, bromostyrene and dibromostyrene; and (vii) acrylates or methacrylates obtained by the reaction of an epoxy group-containing compound with a carboxylic acid compound having methacryl or acryl group, such as epoxy acrylate and epoxy methacrylate.

A study of the present inventors has revealed that the use of the following (D-1) component and/or (D-2) component as (D) component serves to give a polymer having various improved properties. These (D-1) and (D-2) components are categorically included in the (D) component. The (D-1) and (D-2) components may be used in combination with the (D) components described in the above (i) to (iv). Further, the (D-1) component and the (D-2) component may be used in combination.

a) (D-1) component

The (D-1) component includes a diacrylate compound, a dimethacrylate compound and a urethane (meth)acrylate compound having a urethane bond and a plurality of acryloyl or methacryloyl groups. The (D-1) component serves to give a polymer which is further improved in properties such as dyeability, impact resistance.

Of the above compounds included in the (D-1) component, the diacrylate compound and dimethacrylate compound (to be generically referred to as "di(meth)acrylate compound" hereinafter) have the following formula (III-a).

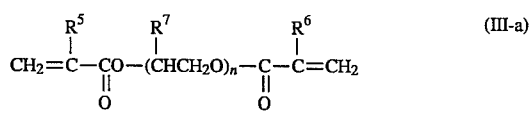

wherein each of $R^5$, $R^6$ and $R^7$ is independently a hydrogen atom or a methyl group, and n is an integer of 1 or more.

In the di(meth)acrylate compound of the above formula (III-a), n may be an integer of 1 or more. For maintaining the dyeability and hardness of the polymer in an excellent state, n is preferably 2 to 30, particularly preferably 6 to 25.

Specific examples of the di(meth)acrylate compound [ the term "di(meth)acrylate" used below refers to acrylate and methacrylate] include polyethylene glycol di(meth)acrylates such as hexaethylene glycol di(meth)acrylate, heptaethylene glycol di(meth)acrylate, octaethylene glycol di(meth)acrylate, nonaethylene glycol di(meth)acrylate, decaethylene glycol di(meth)acrylate, undecaethylene glycol di(meth)acrylate, dodecaethylene glycol di(meth)acrylate, tridecaethylene glycol di(meth)acrylate, tetradecaethylene glycol di(meth)acrylate and pentadecaethylene glycol di(meth)acrylate; and polypropylene glycol di(meth)acrylates such as hexapropylene glycol di(meth)acrylate, heptapropylene glycol di(meth)acrylate, octapropylene glycol di(meth)acrylate, nonapropylene glycol di(meth)acrylate, decapropylene glycol di(meth)acrylate, undecapropylene glycol di(meth)acrylate, dodecapropylene glycol di(meth)acrylate, tridecapropylene glycol di(meth)acrylate, tetradecapropylene glycol di(meth)acrylate and pentadecapropylene glycol di(meth)acrylate. The above di(meth)acrylate compounds may be used alone or in combination.

On the other hand, the remaining urethane (meth)acrylate compound in the (D-1) component has a urethane bond and a plurality of acryloyl or methacryloyl groups. The urethane (meth)acrylate specifically has the following formula (III-b).

wherein $R^{21}$ is a hydrogen atom or an alkyl group, $R^{22}$ is an alkylene group optionally substituted with an acryloyloxymethyl group or a methacryloyloxymethyl group, t is an integer of 2, 3 or 4, and A is a group of the formula of —$(R^{23}NHCOOR^{24}CONH)_uR^{25}$ when t is 2 or a group of the formula of {—$(R^{23}NHCOOR^{24})_u\}_vR^{26}$ when t is 3 or 4, in which each of $R^{23}$, $R^{24}$ and $R^{25}$ is independently an alkylene group, a group of the formula of

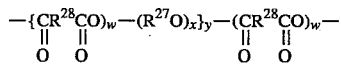

or

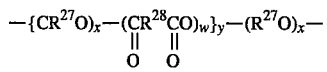

in which each of $R^{27}$ and $R^{28}$ is independently an alkylene or arylene group, each of w and x is independently 0 or 1 and y is an integer of 1 to 10, or a group of the formula of

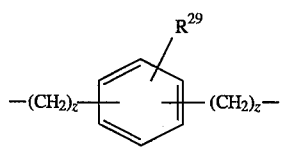

in which $R^{29}$ is a hydrogen atom, a halogen atom or an alkyl group and each of z is independently an integer of 0 to 8, $R^{26}$ is a trivalent or tetravalent hydrocarbon moiety, u is an integer of 0 to 10, and v is the number of groups bonding to $R^{26}$ which number is an integer of 3 or 4.

In the above formula (III-b), the alkyl group preferably has 1 to 6 carbon atoms. Each of the alkylene groups in the above formulae preferably has 1 to 6 carbon atoms, and it is particularly an ethylene or propylene group. The arylene group preferably has 6 to 10 carbon atoms, and it is particularly a phenylene group. The hydrocarbon moiety is generally a trivalent or tetravalent group derived from an alkane having 2 to 6 carbon atoms.

The urethane (meth)acrylate compound of the above formula (III-b) is produced by reacting a polyfunctional isocyanate compound with a compound having a hydroxyl group and a polymerizable double bond and/or a polyol compound according to a known method. Specific examples of the polyfunctional isocyanate compound include ethylene diisocyanate, trimethylene diisocyanate, tetramethylene diisocyanate, hexamethylene diisocyanate, xylylene diisocyanate, tolylene diisocyanate and a polyisocyanate prepolymer. Specific examples of the compound having a hydroxyl group and a polymerizable double bond include 2-hydroxyethyl methacrylate, 2-hydroxyethyl acrylate, 2-hydroxymethyl acrylate, 2-hydroxymethyl methacrylate, glycerin diacrylate and glycerin dimethacrylate. Specific examples of the polyol compound include polyethylene glycol, polypropylene glycol, polyester, polyurethane polyol, pentaerythritol and 2,2-bis(hydroxymethyl)butanol.

In view of the properties of the polymer, such as dyeability and impact resistance, the amount of the di(meth)acrylate compound of the formula (III-a) per 100 parts by weight of the (A) component is in the range of from 1 to 20 parts by weight, preferably 2 to 15 parts by weight, and the amount of the urethane (meth)acrylate compound of the formula (III-b) per 100 parts by weight of the (A) component is in the range of from 1 to 100 parts by weight, preferably 5 to 50 parts by weight.

b) (D-2) component

The (D-2) component includes (meth)acrylate having a hydroxyl group, glycidyl acrylate, α-methylstyrene and epoxy (meth)acrylate. The (D-2) component serves to give a polymer which is improved in hard coatability. Examples of the (meth)acrylate having a hydroxy group include 2-hydroxyethyl methacrylate, 1,2-dihydroxyethyl methacrylate and 2-hydroxypropyl methacrylate. The amount of the (D-2) component per 100 parts by weight of the (A) component is in the range of from 1 to 50 parts by weight, preferably 2 to 30 parts by weight.

(5) (E) component

The polymerizable composition of the present invention can be molded by an ordinary cast molding method to obtain a molded article. Depending upon the polymerization initiator, the polymerization is largely classified into thermal polymerization using a radical polymerization initiator and photo-polymerization using a photo-polymerization initiator. The polymerizable composition of the present invention contains a polymerization initiator as the (E) component.

First, the method using a radical polymerization initiator (thermal polymerization method) will be explained below. In this method, the polymerizable composition containing a radical polymerization initiator is cast into a mold whose mold members are held with elastomer gasket(s) or spacer(s) and cured in an air furnace, and then the resultant molded article is taken out.

The radical polymerization initiator may be selected from compounds known as such. For adjusting the polymerization rate and improving the moldability, it is preferred to use a peroxide and an azo compound of which a 10 hours half-life decomposition temperature is 60° C. or lower in toluene.

Examples of the above radical polymerization initiator include azo compounds such as 2,2'-azobisisobutyronitrile, 2,2'-azobis(2-methylbutyronitrile), 1,1'-azobis(cyclohexane-1-carbonitrile), 2,2'-azobis(4-methoxy-2,4-dimethylvaleronitrile), 2,2'-azobis(2-cyclopropylpropionitrile) and 2,2'-azobis(2,4-dimethylvaleronitrile); diacyl peroxides such as benzoyl peroxide, p-chlorobenzoyl peroxide, decanoyl peroxide, lauroyl peroxide and acetyl peroxide; peroxyesters such as t-butylperoxyneodecanoate, t-butylperoxy-2-ethylhexanoate, t-butylperoxydicarbonate, cumylperoxyneodecanoate and t-butylperoxybenzoate; and percarbonates such as diisopropylperoxydicarbonate, di-2-ethylhexylperoxydicarbonate and di-sec-butylperoxydicarbonate. The above compounds may be used alone or in combination.

Of the above compounds, preferred are 2,2'-azobis(4-methoxy-2,4-dimethylvaleronitrie), 2,2'-azobis(2-cyclopropionitrile) and 2,2'-azobis(2,4-dimethylvalerontirle).

Although differing depending upon the kinds, polymerization conditions and monomer compositions, the amount of the above radical polymerization initiator per 100 parts by weight of the (A) component is in the range of from 0.01 to 10 parts by weight, preferably 0.005 to 5 parts by weight.

Concerning the polymerization conditions for the polymerization method using the radical polymerization initiator, particularly, the temperature has an influence on the properties of a polymer. The temperature cannot be uniformly determined since it differs depending upon the kind and amount of the radical polymerization initiator and the kind of the monomers. However, the polymerization is preferably carried out by a so-called "tapered" two-stage polymerization method in which the polymerization is initiated at a relatively low temperature, the temperature is gradually increased and the article is cured at a high temperature, e.g., between 80° and 150° C. at the end of the polymerization.

The polymerization time cannot be uniformly determined, either, since it differs depending upon various factors. It is therefore preferred to determine the optimum time in advance so as to meet the above conditions. In general, it is preferred to set the conditions for completing the polymerization in 2 to 40 hours.

The polymerizable composition of the present invention can be also polymerized by a known photo-polymerization method using ultraviolet light or visible light in the presence of a photo-polymerization initiator. Examples of the photo-polymerization initiator include benzoin, benzoin methyl ether, benzoin isobutyl ether, benzophenol, acetophenone, 4,4'-dichlorobenzophenone, diethoxyacetophenone, 2-hydroxy-2-methyl-1-phenylpropan-1-one, benzyl methyl ketal, 1-(4-isopropylphenyl)-2-hydroxy-2-methyl-propan-1-one, 1-hydroxycyclohexyl phenyl ketone, 2-isopropylthioxanthone, and 2,4,6-trimethylbenzoyl diphenyl phosphine oxide.

For preventing the coloring and deterioration of the polymer, the amount of the photo-polymerization initiator per 100 parts by weight of the (A) component is in the range of from 0.01 to 10 parts by weight, preferably 0.05 to 2 parts by weight.

The light source for use in the photopolymerization is preferably selected from those which emits ultraviolet light, such as a mercury lamp, a sterilizer lamp and a xenon lamp. Further, visible light such as sunlight can be used. The exposure time differs depending upon the wavelength and intensity of the light source and the form and material of the polymer. It is hence desirable to determine the exposure time by a preliminary test.

For carrying out the photo-polymerization, that portion of the mold which is exposed to light is required to be transparent, and glass is generally used therefor. The above "portion" is preferably formed of quartz glass which is highly permeable to ultraviolet light, while it may be formed of any material which is transparent to light. Further, the polymerization may be carried out under externally applied pressure.

(6) (F) component

The polymerizable composition of the present invention may contain a hindered phenol compound as the (F) component. The hindered phenol compound serves to give a molded article which exhibits excellent releasability from a mold and has excellent transparency.

The hindered phenol compound as the (F) component can be selected from known compounds, while it is preferred to use a hindered phenol compound of the following formula (IV).

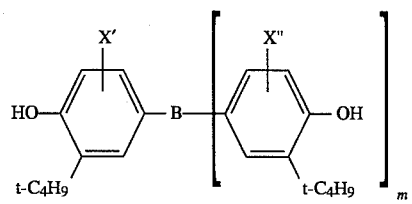
(IV)

wherein each of X' and X" is independently CH$_3$ or t-C$_4$H$_9$, m is 0, 1, 2 or 3, and B is

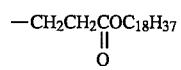

when m=0, any one of

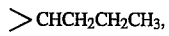

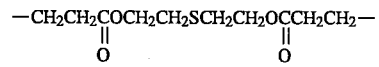

and

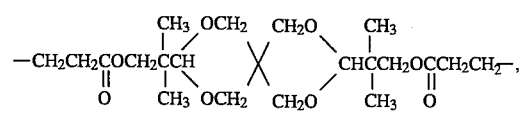

when m=1, any one of

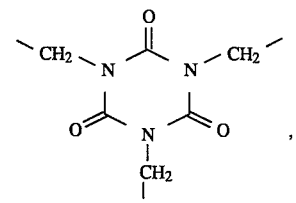

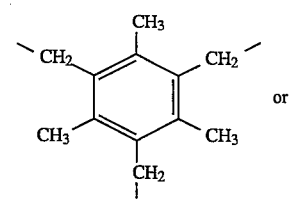

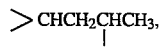

when m=2, or

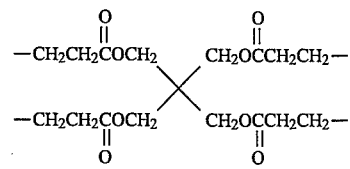

when m=3.

Specific examples of the hindered phenol compound include tri(4-hydroxy-3,5-di-t-butylbenzyl) isocyanurate, 1,1-di(4-hydroxy-2-methyl-5-t-butylphenyl)-3-(4-hydroxy-2-methyl-5-t-butylphenyl)butane, 1,1-di(4-hydroxy-2-methyl-5-t-butylphenyl)butane, octadecanyl 3-(4-hydroxy-3,5-di-t-butylphenyl)propionate, pentaerythritol tetrakis[3-(4-hydroxy-3,5-di-tert-butylphenyl)propionate, β-thiodiglycoldi[3-(4-hydroxy-3,5-di-t-butylphenyl)propionate], spiroglycol-di(4-hydroxy-3-methyl-5-t-butylphenyl)propionate and 1,3,5-tri(4-hydroxy-3,5-di-t-butylbenzyl)-2,4,6-trimethylbenzene.

The amount of the hindered phenol compound per 100 parts by weight of the (A) component (vinylbenzyl composition) is in the range of from 0.005 to 2.0 parts by weight. When the above amount of the hindered phenol compound is less than 0.005 parts by weight, undesirably, it is difficult to obtain a polymer having fully improved mold releasability. When it exceeds 2.0 parts by weight, undesirably, the polymer has decreased hardness and there is a phenomenon that the resin peels off from the mold surface and fails to have surface accuracy.

(7) Other additives

In addition to the above components, the polymerizable composition of the present invention may contain generally known additives such as a mold releasing agent, an ultraviolet absorbent, an antioxidant, a coloring preventer, an antistatic agent, a fluorescent dye, a dye, a pigment and a perfume.

The polymerizable composition itself of the present invention is stable, and it does not undergo polymerization at room temperature, e.g., at 25° C. and can be stably stored for a long period of time.

As already described, the polymerizable composition of the present invention is polymerized by a thermal polymerization or photo-polymerization method thereby to obtain an intended molded article. The so-obtained molded article can be coated with a known coating agent to form a hard coating for improving the scratch resistance of its surface depending upon use. The coating agent for forming a hard coating can be selected from so-called crosslinking substances which form hard coatings by reacting under heat, in the presence of a catalyst or a curing agent, under light or radiation and particularly forming a three-dimensional network structure. Examples of the coating agent include a melamine-containing coating agent containing melamine or its derivative and other reactive substance such as formaldehyde, an acrylic coating agent containing acrylic ester or its derivative and acrylic acid amide or its derivative, an epoxy coating agent containing epoxy and other reactive substance such as bisphenol A, a urethane coating agent containing a polyfunctional isocyanate and other reactive substance such as polyfunctional alcohol, a silicon-containing coating agent containing an organosilicon compound such as methyltrimethoxysilane, and other known coating agents which are composite products of the above agents.

In the present invention, for example, preferred is a coating agent containing, as a constituent, a disilane compound of the following formula (V).

$$(R^9O)_2Si-A^1-Si(OR^{10})_2 \quad \overset{R^{11}}{|} \quad \overset{R^{12}}{|} \quad (V)$$

wherein $A^1$ is a divalent functional group having at least four atoms, each of $R^9$ and $R^{10}$ is independently an alkyl group or an alkoxyalkyl group, and each of $R^{11}$ and $R^{12}$ is independently an alkyl group or an alkoxy group.

In the above formula (V), the divalent functional group for $A^1$ preferably includes alkylene groups such as a butylene group, an isobutylene group and a hexamethylene group; ether bond-containing alkylene groups such as —CH$_2$CH$_2$OCH$_2$CH$_2$— and —CH$_2$CH$_2$CH$_2$OCH$_2$CH$_2$CH$_2$—; carbonate bond-containing alkylene groups such as

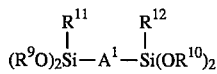

and

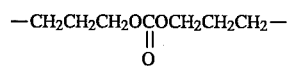

and ester bond-containing alkylene groups such as —CH$_2$CH$_2$COOCH$_2$CH$_2$OCOCH$_2$CH$_2$— and —CH$_2$CH(CH$_3$)COOCH$_2$CH$_2$OCOCH(CH$_3$)CH$_2$—. The alkyl group for $R^9$ and $R^{10}$ has 1 to 6 carbon atoms, and the alkoxyalkyl group for $R^9$ and $R^{10}$ has 2 to 6 carbon atoms. The alkyl group or alkoxy group for $R^{11}$ and $R^{12}$ has 1 to 4 carbon atoms.

For improving the adhesion between a molded article of the polymer and the hard coating, it is preferred to pretreat the molded article. For example, the pretreatment may be carried out by a known alkali treatment. The stronger the alkali is, the stronger the adhesion is. Since, however, the molded article itself may deteriorate when the alkalinity is too high, it is preferred to carry out the alkali treatment under moderate conditions, for example, in an aqueous solution containing 30 % by weight of NaOH at 80° C. for 1 hour.

A molded article of the polymer produced by molding and curing the above polymerizable composition may be coated with an inorganic hard substance for preventing the reflection as required. The coating can be carried out by a known method. For example, the coating is preferably carried out by any one of the dry plating methods, such as a vacuum vapor deposition method, an ion plating method and a sputtering method. The thickness of the coating of an inorganic hard substance differs depending upon use and cannot be uniformly determined, while it is generally preferably 0.1 to 10 μm.

The inorganic hard substance is properly selected from any inorganic compounds and metals which can form a coating on the surface of the above molded article by any one of the above dry plating methods. For example, for imparting scratch resistance, the inorganic hard substance is generally selected from silicon oxide (SiO$_x$, x=1–2) and aluminum oxide. For imparting anti-reflection properties, it is selected from metal oxides such as silicon oxide, aluminum oxide, zirconium oxide, titanium oxide, magnesium oxide, cerium oxide, indium oxide, tantalum oxide and hafnium oxide; metal fluorides such as magnesium fluoride, cerium fluoride, lithium fluoride and neodymium fluoride; metal sulfides such as zinc sulfide; and metals such as aluminum, gold, silver and chromium. A substance having a low refractive index and a substance having a high refractive index may be alternately laminated in an optical thickness. Further, for imparting reflection properties and scratch resistance, a coating may be formed of a diamond-like carbon in which fine diamond crystals are dispersed in amorphous carbon.

A molded article of the polymer obtained by the polymerization of the polymerizable composition of the present invention is free from coloring in the heat treatment carried out for improving the adhesion of a coating agent prior to the application of the coating agent, has sufficient properties as an ophthalmic lens such as a high refractive index, a high Abbe's number and a low specific gravity, and is excellent in transparency, light resistance, heat resistance, impact resistance, dyeability and odorless properties in cutting and processing. Further, the polymerizable composition of the present invention is free from gelation caused by the polymerization when stored, which occurs to conventional polymerizable compositions, and is therefore excellent in storage stability.

Therefore, a molded article of the polymer obtained by the polymerization of the polymerizable composition of the present invention is useful as an organic glass and suitable as an optical lens, such as an ophthalmic lens or a lens for an optical device, and it can be suitably used in the fields of a prism, an optical disk substrate and an optical fiber.

EXAMPLES

The present invention will be explained more in detail hereinafter with reference to the following Examples, to which, however, the present invention shall not be limited.

Resins obtained in the Examples were measured for various properties by the following methods.

(1) Abbe's number (Refractive index)

A test piece was measured for a refractive index at 20° C. with an Abbe refractometer supplied by Atago K. K. Bromonaphthalene or methylene iodide was used as a contact solution.

(2) Hardness

A 2 mm thick test piece was measured for a hardness at an L-scale with a Rockwell hardness tester.

(3) Appearance

A test piece was visually evaluated.

(4) Specific gravity

A test pieces was measured for a specific gravity with an electronic specific gravity meter (ED-120T) supplied by Mirage Trading Co.

(5) Dyeability

2 Grams of a dispersible dye (trade name: Vista Brown, supplied by Hattori Seiko K. K.) was dispersed in 1 liter of water, and the dispersion was heated. A test piece was dyed in the dispersion at 90° C. for 10 minutes. The dyed test piece was measured for a color density with a double beam spectrophotometer 220A supplied by Hitachi Limited, and the color density was expressed in terms of a loss percentage of light transmittance at 550 nm.

(6) Light resistance

A sample was placed in a long life xenon fadometer (model: FAC-25AX-HC, supplied by Suga Test Instruments Co., Ltd) and exposed to xenon light for 100 hours. Then, the sample was measured for YI with a color-difference meter (model: SM-4, supplied by Suga Test Instruments Co., Ltd), and the light resistance was expressed in terms of an increment, $\Delta YI$, obtained by reducing an initial YI from the above-measured YI.

(7) Impact resistance

Steel balls having a weight of 16 g, 32 g, 48 g, 64 g, 80 g and 96 g were dropped on test plates having a thickness of 2 mm and a diameter of 65 mm, and the impact resistance was expressed in terms of the weight of the steel ball which was one-rank lighter than the steel ball which broke the test piece.

(8) Hard coatability

Hard coating solutions were prepared from a silicon-containing hard coating agent (trade name: TS-56T, supplied by Tokuyama Soda Co., Ltd.), and the hard coating solution which aged one week after the preparation and the hard coating solution which aged one month after the preparation were applied to test pieces. A test piece which showed excellent adhesion to the hard coating solution which aged one month after the preparation was taken as A, a test piece which showed excellent adhesion only to the hard coating solution which aged one week after the preparation was taken as B, and a test piece which showed poor adhesion was taken as X.

(9) Offensive odor

Samples were polished with a polisher (Topcon ALE-60, supplied by Tokyo Optical Co., Ltd). A sample which generated extreme offensive odor was taken as 1, a sample which generated offensive order was taken as 2, a sample which generated offensive odor to some extent was taken as 3, a sample which generated slight offensive odor was taken as 4, a sample which generated almost no offensive odor was taken as 5, and a sample which generated no offensive odor was taken as 6.

(10) Resistance to yellowing under heat

A 2 mm thick sample was heated at 130° C. for 2 hours, and then measured for YI with a color-difference meter (model SM-4, supplied by Suga Test Instruments Co., Ltd), and the resistance to yellowing under heat was expressed in terms of an increment, $\Delta YI$, obtained by reducing an initial YI from the above-measured YI.

(11) Storage stability

Polymerizable compositions were stored at 25° C. for 30 days, and then filtered through a membrane filter having an opening diameter of 2 μm. A polymerizable composition which did not remain adhering to the filter in the form of a gel-like substance was taken as A, and a polymerizable composition which at least remained adhering to the filter in the form of a gel-like substance was taken as X.

(12) Surface smoothness

A sample was measured for a surface roughness with a surface roughness tester, and a sample which showed an Ra of less than 100 μm was taken as A, and a sample which showed an Ra of 100 μm or more was taken as X.

(13) Coloring

A sample was measured for YI with a color-difference meter (model SM-4, supplied by Suga Test Instruments Co., Ltd).

(14) Mold releasability

Ten lenses were produced by molding one polymerizable composition, and the number of lenses which did not break when taken out of the mold was shown in Tables.

Compounds and abbreviations used in the following Examples are as follows.

(A) component

VBE: (p-vinylbenzyl)ether

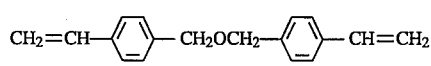

VPE: 1,2-(p-vinylphenyl)ethane

VBS: (p-vinylbenzyl)sulfide

BVBE: 1,2-bis (1'-vinyl-2'-bromophenyl)ethane

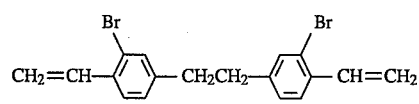

VOSE: 1-(p-vinylbenzyloxy)-2-(p-vinylbenzylthio)ethane

UA-GXE: urethane acrylate of the following formula

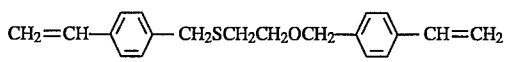

VBES: bis(p-vinylbenzyloxyethyl)sulfide

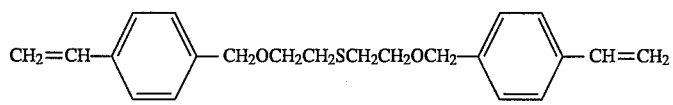

(B) component
DPMP: 2,4-diphenyl-4-methyl-1-pentene
(C) component
BDTP: $HSC_2H_4COOC_4H_8OOCC_2H_4SH$
BDTG: $HSCH_2COOC_4H_8OOCCH_2SH$
EGTG: $HSCH_2COOC_2H_4OOCCH_2SH$
HGTG: $HSCH_2COOC_6H_{12}OOCCH_2SH$
EDT: $HSC_2H_4SH$
DMES: $HSC_2H_4SC_2H_4SH$
PETP: $C(CH_2OOCC_2H_4SH)_4$
PETG: $C(CH_2OOCCH_2SH)_4$
TETP: $CH_3C(CH_2OOCC_2H_4SH)_3$
TPTP: $C_2H_5C(CH_2OOCC_2H_4SH)_3$
TPTG: $C_2H_5C(CH_2OOCCH_2SH)3$
(D) component
UA-HTP1: urethane acrylate of the following formula

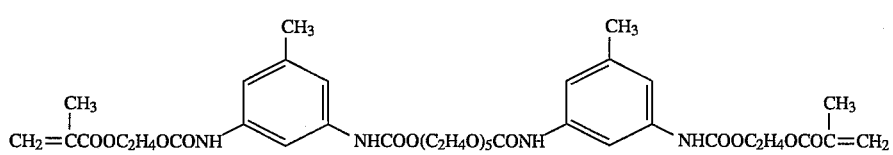

UA-HTP2: urethane acrylate of the following formula

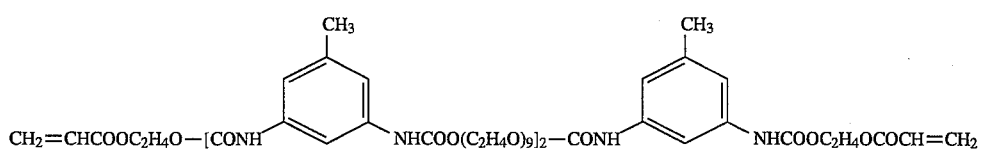

UA-GX3: urethane acrylate of the following formula

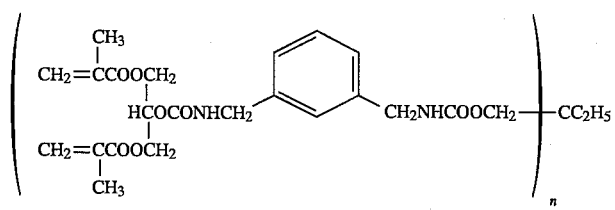

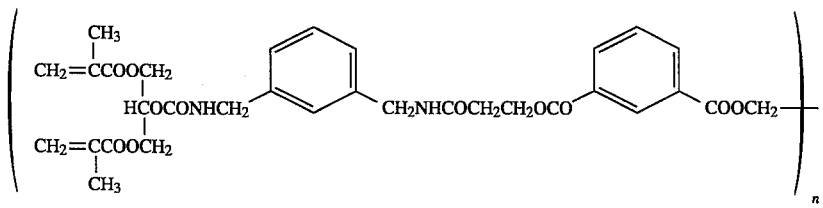

2G: diethylene glycol dimethacrylate (n=2)

9G: polyethylene glycol #400 dimethacrylate (average of n=9)

14G: polyethylene glycol #600 dimethacrylate (average of n=14)

HEMA: 2-hydroxyethyl methacrylate

GMA: glycidyl methacrylate

40EM: epoxy acrylate of the following formula
$[CH_2=C(CH_3)COOCH_2CH(OH)CH_2OCH_2\text{—}]_2$ α-MeSt: α-methylstyrene St: styrene MMA: methyl methacrylate EGDM: ethylene glycol dimethacrylate (E) component AMOVN: 2,2'-azobis(4-methoxy-2,4-dimethylvaleronitrile)

ADMVN: 2,2'-azobis(2,4-dimethylvaleronitrile)

AIBN: 2,2'-azobisisobutyronitrile

AMVN: 2,2'-azobis(2-methylbutyronitrile)

PBND: t-butylperoxyneodecanoate

PBO: t-butylperoxy(2-ethylhexanoate)

HCPK: 1-hydroxycyclohexyl phenyl ketone

PHMP: 1-phenyl-2-hydroxy-2-methylpropan-1-one

TMDPO: 2,4,6-trimethylbenzoyldiphenyl-phosphine oxide

MPG: methylphenylglyoxylate (F) component

THBI: tri(4-hydroxy-3,5-di-t-butylbenzyl)-isocyanurate

DHMB: 1,1-di(4-hydroxy-2-methyl-5-t-butyl-phenyl)butane

THPO: octadecanyl 3-(4-hydroxy-3,5-di-t-butylphenyl)propionate

PTHP: pentaerythritoltetrakis(3-(4-hydroxy-3,5-di-t-butylphenyl)propionate)

TGTP: β-thiodiglycol di(3-(4-hydroxy-3,5-di-t-butylphenyl)propionate)

SGDP: spiroglycol di(4-hydroxy-3-methyl-5-t-butylphenyl)propionate

THMB: 1,3,5-tri(4-hydroxy-3,5-di-t-butyl-benzyl)-2,4,6-trimethylbenzene

EXAMPLE I

A vinylbenzyl compound shown in Table 1, DPMP (2,4-diphenyl-4-methyl-1-pentene), optional copolymerizable comonomer(s) and an optional mercapto compound were mixed to prepare a composition as shown in Table 1. Then, 1 part by weight of t-butylperoxyisobutyrate as a radical polymerization initiator was fully mixed with 100 parts by weight of the above composition to obtain a polymerizable composition (mixed solution). Polymerizable compositions in Run Nos. 1 to 50 were obtained in the above manner. Table 1 shows the storage stability of each polymerizable composition (mixed solution). Each of the polymerizable compositions was respectively cast into a mold formed of glass plates and gaskets of an ethylene-vinyl acetate copolymer to carry out the cast-molding in an air furnace. The molding was carried out by gradually increasing the temperature from 30° C. to 120° C. over 15 hours, and keeping the temperature of 120° C. for 2 hours. After the polymerization, the molds were taken out of the air furnace and allowed to cool, and polymers as molded articles were taken out of the molds. Table 1 shows the properties of the polymers. All the polymers in Run Nos. 1 to 50, shown in Table 1, had transparent appearances.

In Table 1, Run Nos. 1 to 46 correspond to Examples of the present invention, and Run Nos. 47 to 50 correspond to Comparative Examples.

TABLE 1-1

| Run No. | Monomer composition (parts by weight) | | |
|---|---|---|---|
| | Vinylbenzyl compound | DPMP | Comonomer |
| I-1 | VOSE (100) | (0.2) | — |
| I-2 | " | (1) | — |
| I-3 | " | (10) | — |
| I-4 | VBES (100) | (1) | — |
| I-5 | " | (5) | — |
| I-6 | VOSE (100) | (1) | UA-HTP1 (10) |
| I-7 | " | (5) | " |
| I-8 | " | (1) | UA-HTP1 (5) |
| I-9 | " | " | UA-HTP1 (20) |
| I-10 | " | " | UA-HTP1 (50) |
| I-11 | " | " | UA-GX3 (10) |
| I-12 | " | " | U-GXE (10) |
| I-13 | " | " | UA-HTP2 (10) |

| Run No. | Physical properties of the polymer | | | | | | | | | | Storage stability of polymerizable composition |
|---|---|---|---|---|---|---|---|---|---|---|---|
| | Refractive index | Abbe's number | Hardness | Specific gravity | Resistance to yellowing under heat | Light resistance | Dyeability (%) | Hard coating property | Impact resistance | Odor | Surface smoothness | |
| I-1 | 1.625 | 29 | 115 | 1.15 | 0.20 | 2.49 | 15 | B | 32 | 5 | A | A |
| I-2 | 1.625 | 29 | 115 | 1.15 | 0.23 | 2.46 | 15 | B | 32 | 5 | A | A |
| I-3 | 1.613 | 29 | 114 | 1.14 | 0.21 | 2.40 | 20 | B | 32 | 5 | A | A |
| I-4 | 1.608 | 32 | 110 | 1.16 | 0.25 | 2.30 | 26 | B | 32 | 5 | A | A |
| I-5 | 1.606 | 32 | 110 | 1.16 | 0.26 | 2.28 | 30 | B | 32 | 5 | A | A |
| I-6 | 1.616 | 31 | 111 | 1.16 | 0.21 | 2.39 | 43 | B | 80 | 5 | A | A |
| I-7 | 1.616 | 31 | 111 | 1.15 | 0.24 | 2.42 | 44 | B | 80 | 5 | A | A |
| I-8 | 1.616 | 30 | 113 | 1.15 | 0.23 | 2.37 | 36 | B | 80 | 5 | A | A |
| I-9 | 1.609 | 33 | 109 | 1.16 | 0.29 | 2.23 | 55 | B | 80 | 5 | A | A |
| I-10 | 1.593 | 37 | 102 | 1.18 | 0.22 | 2.19 | 69 | B | 81 | 5 | A | A |
| I-11 | 1.615 | 31 | 112 | 1.16 | 0.23 | 2.44 | 43 | B | 80 | 5 | A | A |
| I-12 | 1.617 | 31 | 111 | 1.16 | 0.22 | 2.41 | 45 | B | 80 | 5 | A | A |
| I-13 | 1.616 | 31 | 111 | 1.16 | 0.20 | 2.44 | 45 | B | 80 | 5 | A | A |

TABLE 1-2

| Run No. | Monomer composition (parts by weight) | | | | |
|---|---|---|---|---|---|
| | Vinylbenzyl compound | DPMP | Comonomer (1) | Comonomer (2) | Mercapto compound |
| I-14 | VBE (100) | (1) | UA-HTP1 (10) | HEMA (10) | BDTP (25) |
| I-15 | " | " | " | " | BDTG (25) |
| I-16 | " | " | " | " | EGTG (25) |
| I-17 | " | " | " | " | HGTG (25) |
| I-18 | " | " | " | " | EDT (25) |
| I-19 | " | " | " | " | DMES (25) |
| I-20 | " | " | " | GMA (10) | BDTP (25) |
| I-21 | VBS (100) | " | " | HEMA (10) | PETP (25) |
| I-22 | VBE (100) | " | " | α-MeSt (10) | BDTP (25) |
| I-23 | " | " | UA-HTP2 (10) | HEMA (10) | " |
| I-24 | " | " | UA-GXE (10) | " | " |
| I-25 | " | " | 14G (10) | " | " |
| I-26 | " | " | UA-HTP1 (10) | 40EM (10) | PETP (25) |
| I-27 | VOSE (100) | " | " | HEMA (10) | BDTP (25) |
| I-28 | VPE (100) | " | " | " | " |
| I-29 | BVBE (100) | " | " | " | " |
| I-30 | VBES (100) | " | " | " | " |
| I-31 | VBE (100) | " | " | " | PETP (25) |
| I-32 | " | " | " | " | PETG (25) |

| Run No. | Physical properties of the polymer | | | | | | | | | | Storage stability of olymerizable composition |
|---|---|---|---|---|---|---|---|---|---|---|---|
| | Refractive index | Abbe's number | Hardness | Specific gravity | Resistance to yellowing under heat | Light resistance | Dyeability (%) | Hard coating property | Impact resistance | Odor | Surface smoothness | |
| I-14 | 1.590 | 34 | 108 | 1.18 | 0.24 | 2.41 | 70 | A | 96 | 5 | A | A |
| I-15 | 1.590 | 34 | 108 | 1.18 | 0.25 | 2.49 | 71 | A | 96 | 5 | A | A |
| I-16 | 1.592 | 33 | 109 | 1.18 | 0.27 | 2.43 | 68 | A | 96 | 5 | A | A |
| I-17 | 1.590 | 34 | 107 | 1.18 | 0.25 | 2.45 | 71 | A | 96 | 5 | A | A |
| I-18 | 1.610 | 32 | 109 | 1.18 | 0.26 | 2.41 | 63 | A | 96 | 4 | A | A |

TABLE 1-2-continued

| I-19 | 1.607 | 32 | 109 | 1.18 | 0.25 | 2.47 | 64 | A | 96 | 4 | A | A |
| I-20 | 1.590 | 34 | 108 | 1.18 | 0.24 | 2.41 | 70 | A | 96 | 5 | A | A |
| I-21 | 1.615 | 33 | 107 | 1.19 | 0.25 | 2.42 | 70 | A | 96 | 4 | A | A |
| I-22 | 1.590 | 34 | 108 | 1.18 | 0.35 | 2.60 | 71 | A | 96 | 5 | A | A |
| I-23 | 1.591 | 34 | 108 | 1,18 | 0.26 | 2.43 | 70 | A | 96 | 5 | A | A |
| I-24 | 1.591 | 34 | 108 | 1.18 | 0.24 | 2.45 | 70 | A | 96 | 5 | A | A |
| I-25 | 1.590 | 34 | 107 | 1.18 | 0.25 | 2.41 | 72 | A | 80 | 5 | A | A |
| I-26 | 1.601 | 33 | 110 | 1.18 | 0.26 | 2.38 | 65 | A | 96 | 5 | A | A |
| I-27 | 1.607 | 32 | 104 | 1.18 | 0.24 | 2.42 | 75 | A | 96 | 5 | A | A |
| I-28 | 1.611 | 10 | 108 | 1.17 | 0.23 | 2.41 | 69 | A | 96 | 5 | A | A |
| I-29 | 1.620 | 31 | 107 | 1.33 | 0.21 | 2.45 | 69 | A | 96 | 5 | A | A |
| I-30 | 1.602 | 32 | 98 | 1.20 | 0,24 | 2.41 | 80 | A | 96 | 5 | A | A |
| I-31 | 1.592 | 34 | 110 | 1.19 | 0.25 | 2.41 | 67 | A | 96 | 5 | A | A |
| I-32 | 1.592 | 34 | 110 | 1.19 | 0.25 | 2.49 | 68 | A | 96 | 5 | A | A |

TABLE 1-3

| Run No. | Monomer composition (parts by weight) | | | | |
|---|---|---|---|---|---|
| | Vinylbenzyl compound | DPMP | Comonomer (1) | Comonomer (2) | Mercapto compound |
| I-33 | VBE (100) | (1) | UA-HTPI (10) | HEKA (10) | TETP (25) |
| I-34 | " | " | " | " | TPTP (25) |
| I-35 | " | " | " | " | TPTG (25) |
| I-36 | " | " | " | GMA (10) | PETP (25) |
| I-37 | " | " | " | α-MeSt (10) | " |
| I-38 | " | " | UA-HTP2 (10) | HEMA (10) | " |
| I-39 | " | " | UA-GXE (10) | " | " |
| I-40 | " | " | 2G (10) | " | " |
| I-41 | " | " | 9G (10) | " | PETP (10) |
| I-42 | " | " | 14G (10) | " | " |
| I-43 | VOSE (100) | " | UA-HTP1 (10) | " | PETP (25) |
| I-44 | VPE (100) | " | " | " | " |
| I-45 | BVBE (100) | " | " | " | " |
| I-46 | VBES (100) | " | " | " | " |
| I-47 | " | — | — | — | — |
| I-48 | VOSE (100) | — | — | — | — |
| I-49 | " | — | — | 14G (10) | — |
| I-50 | MMA (100) | (1) | EGDM (10) | — | — |

| Run No. | Physical properties of the polymer | | | | | | | | | | Storage stability of olymerizable composition |
|---|---|---|---|---|---|---|---|---|---|---|---|
| | Refractive index | Abbe's number | Hardness | Specific gravity | Resistance to yellowing under heat | Light resistance | Dyeability (%) | Hard coating property | Impact resistance | Odor | Surface smoothness | |
| I-33 | 1.597 | 33 | 109 | 1.19 | 0.27 | 2.43 | 68 | A | 96 | 5 | A | A |
| I-34 | 1.595 | 34 | 108 | 1.19 | 0.24 | 2.45 | 65 | A | 96 | 5 | A | A |
| I-35 | 1.610 | 33 | 109 | 1.19 | 0,26 | 2.41 | 61 | A | 96 | 5 | A | A |
| I-36 | 1.592 | 34 | 110 | 1.19 | 0.24 | 2.41 | 67 | A | 96 | 5 | A | A |
| I-37 | 1.592 | 34 | 110 | 1.19 | 0.36 | 2.60 | 68 | A | 96 | 5 | A | A |
| I-38 | 1.595 | 34 | 110 | 1.19 | 0.27 | 2.43 | 67 | A | 96 | 5 | A | A |
| I-39 | 1.595 | 34 | 109 | 1.19 | 0.25 | 2.45 | 67 | A | 96 | 5 | A | A |
| I-40 | 1.596 | 33 | 110 | 1.19 | 0.25 | 2.36 | 59 | A | 96 | 5 | A | A |
| I-41 | 1.597 | 34 | 108 | 1.19 | 0.24 | 2.41 | 65 | A | 80 | 5 | A | A |
| I-42 | 1.592 | 34 | 107 | 1.19 | 0.26 | 2.41 | 70 | A | 80 | 5 | A | A |
| I-43 | 1.610 | 32 | 105 | 1,19 | 0.25 | 2.42 | 73 | A | 96 | 5 | A | A |
| I-44 | 1.613 | 31 | 108 | 1.18 | 0.25 | 2.41 | 66 | A | 96 | 5 | A | A |
| I-45 | 1.625 | 32 | 108 | 1.34 | 0.22 | 2.45 | 65 | A | 96 | 5 | A | A |
| I-46 | 1.605 | 32 | 100 | 1.21 | 0.25 | 2.41 | 78 | A | 96 | 5 | A | A |
| I-47 | 1.608 | 33 | 110 | 1.16 | 2.36 | 2.56 | 10 | B | 16 | 5 | X | X |
| I-48 | 1.625 | 29 | 115 | 1.15 | 2.10 | 2.61 | 8 | B | 16 | 5 | X | X |
| I-49 | 1.616 | 31 | 110 | 1.16 | 2.01 | 2.25 | 41 | B | 16 | 5 | A | X |
| I-50 | 1.496 | 56 | 110 | 1.24 | 0.37 | 1.36 | 3 | X | 16 | 5 | A | X |

EXAMPLE II

A vinylbenzyl compound, DPMP, a comonomer, a mercapto compound and a polymerization initiator, all shown in Table 2, were mixed to prepare a polymerizable composition. Polymerizable compositions in Run Nos. 1 to 29 were obtained in the above manner. Table 2 shows the storage stability of each polymerizable composition. Polymers were obtained from these polymerizable compositions in the same manner as in Example I, and Table 2 shows the properties of the polymers. All the polymers obtained in Run Nos. 1 to 29 had transparent appearances.

In Table 2, Run Nos. 1 to 29 all correspond to Examples of the present invention.

TABLE 2-1

| | Monomer composition (parts by weight) | | | | | |
|---|---|---|---|---|---|---|
| Run No. | Vinylbenzyl compound | DPMP | Comonomer | Mercapto compound | Initiator (1) | Initiator (2) |
| II-1 | VBE (100) | (1) | UA-HTP1 (10) | BDTP (25) | ADMVN (0.5) | — |
| II-2 | " | " | " | BDTG (25) | " | — |
| II-3 | " | " | " | EGTG (25) | " | AMOVN (0.5) |
| II-4 | " | " | " | HGTG (25) | " | PBND (0.5) |
| II-5 | " | " | " | EDT (25) | AMOVN (0.5) | — |
| II-6 | " | " | UA-GX3 (10) | DMES (25) | " | PBO (0.5) |
| II-7 | " | " | HEMA (10) | BDTP (25) | ADMVN (0.5) | — |
| II-8 | " | " | St (10) | — | " | — |
| II-9 | " | " | UA-HTP2 (10) | " | " | — |
| II-10 | " | " | UA-GXE (10) | " | " | — |
| II-11 | " | " | GMA (10) | " | " | AMOVN (0.5) |
| II-12 | VOSE (100) | " | UA-HTP1 (10) | " | " | — |
| II-13 | VPE (100) | " | " | " | " | AMOVN (0.5) |
| II-14 | BVBE (100) | " | HEMA (10) | " | " | — |
| II-15 | VBES (100) | " | " | " | " | PBND (0.5) |

| | Physical properties of the polymer | | | | | | | | | | | Storage stability of polymerizable composition |
|---|---|---|---|---|---|---|---|---|---|---|---|---|
| Run No. | Refractive index | Abbe's number | Hardness | Specific gravity | Resistance to yellowing under heat | Coloration | Light resistance | Dyeability (%) | Hard coating property | Impact resistance | Odor | Surface smoothness | |
| II-1 | 1.603 | 32 | 108 | 1.17 | 0.25 | 0.85 | 2.41 | 70 | B | 96 | 5 | A | A |
| II-2 | 1.603 | 32 | 108 | 1.17 | 0.24 | 0.90 | 2.49 | 71 | B | 96 | 5 | A | A |
| II-3 | 1.604 | 32 | 109 | 1.17 | 0.25 | 0.89 | 2.43 | 68 | B | 96 | 5 | A | A |
| II-4 | 1.600 | 33 | 107 | 1.16 | 0.25 | 0.83 | 2.45 | 71 | B | 96 | 5 | A | A |
| II-5 | 1.615 | 32 | 109 | 1.17 | 0.24 | 0.97 | 2.41 | 63 | B | 96 | 4 | A | A |
| II-6 | 1.607 | 32 | 109 | 1.17 | 0.26 | 0.94 | 2.47 | 64 | B | 96 | 4 | A | A |
| II-7 | 1.602 | 33 | 108 | 1.16 | 0.24 | 0.90 | 2.41 | 70 | A | 64 | 5 | A | A |
| II-8 | 1.609 | 32 | 108 | 1.14 | 0.24 | 0.88 | 2.60 | 71 | B | 64 | 5 | A | A |
| II-9 | 1.602 | 33 | 108 | 1.17 | 0.24 | 0.86 | 2.43 | 70 | B | 96 | 5 | A | A |
| II-10 | 1.603 | 33 | 108 | 1.17 | 0.25 | 0.91 | 2.45 | 70 | B | 96 | 5 | A | A |
| II-11 | 1.600 | 33 | 107 | 1.17 | 0.24 | 0.92 | 2,41 | 72 | A | 64 | 5 | A | A |
| II-12 | 1.614 | 31 | 104 | 1.17 | 0.26 | 0.93 | 2.42 | 75 | B | 96 | 5 | A | A |
| II-13 | 1.617 | 29 | 108 | 1.17 | 0.25 | 1.09 | 2.41 | 69 | B | 96 | 5 | A | A |
| II-14 | 1.626 | 31 | 107 | 1.43 | 0.23 | 0.99 | 2.45 | 69 | A | 64 | 5 | A | A |
| II-15 | 1.607 | 33 | 98 | 1.20 | 0.26 | 0.88 | 2.41 | 80 | A | 64 | 5 | A | A |

TABLE 2-2

| | Monomer composition (parts by weight) | | | | | |
|---|---|---|---|---|---|---|
| Run No. | Vinylbenzyl compound | DPMP | Comonomer | Mercapto compound | Initiator (1) | Initiator (2) |
| II-16 | VBE (100) | (1) | UA-HTP1 (10) | PETP (25) | ADMVN (0.5) | — |
| II-17 | " | " | " | PETG (25) | " | — |
| II-18 | " | " | " | TETP (25) | " | AMOVN (0.5) |
| II-19 | " | " | HEMA (10) | TPTP (25) | " | " |
| II-20 | " | " | " | TPTG (25) | " | PBND (0.5) |
| II-21 | " | " | St (10) | PETP (25) | " | — |
| II-22 | " | " | GMA (10) | " | " | — |
| II-23 | " | " | UA-HTP2 (10) | " | " | — |
| II-24 | " | " | UA-GXE (10) | " | " | — |
| II-25 | " | " | 14G (10) | " | " | AMVN (0.5) |
| II-26 | VOSE (100) | " | UA-HTP1 (10) | " | " | — |
| II-27 | VPE (100) | " | " | " | " | — |
| II-28 | BVBE (100) | " | St (10) | " | AMOVN (10) | PBO (0.5) |
| II-29 | VBES (100) | " | α-MeSt (10) | " | " | AIBN (0.5) |

| | Physical properties of the polymer | | | | | | | | | | | Storage stability of polymerizable composition |
|---|---|---|---|---|---|---|---|---|---|---|---|---|
| Run No. | Refractive index | Abbe's number | Hardness | Specific gravity | Resistance to yellowing under heat | Coloration | Light resistance | Dyeability (%) | Hard coating property | Impact resistance | Odor | Surface smoothness | |

TABLE 2-2-continued

| | | | | | | | | | | | | | |
|---|---|---|---|---|---|---|---|---|---|---|---|---|---|
| II-16 | 1.601 | 33 | 110 | 1.18 | 0.24 | 0.88 | 2.41 | 67 | B | 96 | 5 | A | A |
| II-17 | 1.602 | 33 | 110 | 1.18 | 0.25 | 0.90 | 2.49 | 68 | B | 96 | 5 | A | A |
| II-18 | 1.598 | 33 | 109 | 1.18 | 0.26 | 0.87 | 2.43 | 68 | B | 96 | 5 | A | A |
| II-19 | 1.595 | 33 | 108 | 1.18 | 0.24 | 0.84 | 2.45 | 65 | A | 64 | 5 | A | A |
| II-20 | 1.603 | 33 | 109 | 1.18 | 0.25 | 0.86 | 2.41 | 61 | A | 64 | 5 | A | A |
| II-21 | 1.610 | 33 | 110 | 1.16 | 0.25 | 0.89 | 2.41 | 57 | B | 64 | 5 | A | A |
| II-22 | 1.601 | 33 | 110 | 1.18 | 0,26 | 0.93 | 2.60 | 68 | A | 80 | 5 | A | A |
| II-23 | 1.604 | 33 | 110 | 1.18 | 0.24 | 0.87 | 2.43 | 67 | B | 96 | 5 | A | A |
| II-24 | 1.601 | 33 | 109 | 1.18 | 0,27 | 0.90 | 2.45 | 67 | B | 96 | 5 | A | A |
| II-25 | 1.596 | 34 | 107 | 1.18 | 0.26 | 0.86 | 2.41 | 70 | B | 64 | 5 | A | A |
| II-26 | 1.613 | 31 | 105 | 1.18 | 0.26 | 0.96 | 2.42 | 73 | B | 96 | 5 | A | A |
| II-27 | 1.615 | 31 | 108 | 1.17 | 0.24 | 1.11 | 2.41 | 66 | B | 96 | 5 | A | A |
| II-28 | 1.628 | 31 | 108 | 1.35 | 0.26 | 1.08 | 2.45 | 61 | B | 64 | 5 | A | A |
| II-29 | 1.606 | 33 | 100 | 1.19 | 0,26 | 0.85 | 2.41 | 58 | B | 80 | 5 | A | A |

EXAMPLE III

A vinylbenzyl compound shown in Table 3, DPMP, copolymerizable comonomers, a mercapto compound and a hindered phenol compound, all shown in Table 3, were mixed to prepare a composition. Then, 1 part by weight of 2,2'-azobis(2,4-dimethylvaleronitrile) as a radical polymerization initiator was fully mixed with 100 parts by weight of the above composition to obtain a polymerizable composition (mixed solution). Polymerizable compositions in Run Nos. 1 to 31 were obtained in the above manner. Table 3 shows the storage stability of each polymerizable composition (mixed solution). Each of the polymerizable compositions was respectively cast into a mold formed of glass plates and gaskets of an ethylene-vinyl acetate copolymer to carry out the cast-molding in an air furnace. The molding was carried out by gradually increasing the temperature from 30° C. to 120° C. over 15 hours, and keeping the temperature of 120° C. for 2 hours. After the polymerization, the molds were taken out of the air furnace and allowed to cool, and polymers as molded articles were taken out of the molds. Table 3 shows the mold releasability and properties of the polymers. All the polymers in Run Nos. 1 to 31, shown in Table 3, had transparent appearances.

In Table 3, all the Run Nos. 1 to 31 correspond to Examples of the present invention.

TABLE 3-1

| | Monomer composition (parts by weight) | | | | | |
|---|---|---|---|---|---|---|
| Run No. | Vinylbenzyl compound | DPMP | Comonomer (1) | Comonomer (2) | Mercapto compound | Hindered phenol |
| III-1 | VBE (100) | (1) | UA-HTP1 (10) | HEMA (10) | PETP (25) | PTHP (0.1) |
| III-2 | " | " | " | " | " | PTHP (0.3) |
| III-3 | " | " | " | " | " | PTHP (1.0) |
| III-4 | " | " | " | " | " | PTHP (1.5) |
| III-5 | " | " | " | " | TETP (25) | PTHP (0.3) |
| III-6 | " | " | " | " | PETG (25) | " |
| III-7 | " | " | " | " | TPTP (25) | " |
| III-8 | " | " | " | " | BDTP (25) | " |
| III-9 | " | " | " | " | BDTG (25) | " |
| III-10 | " | " | " | " | PETP (25) | THBI (0.1) |
| III-11 | " | " | " | " | " | THBI (1.0) |
| III-12 | " | " | " | " | " | DHMB (0.3) |
| III-13 | " | " | " | " | " | DHMB (1.0) |
| III-14 | " | " | " | " | " | THPO (0.3) |
| III-15 | " | " | " | " | " | THPO (1.0) |

| | Physical properties of the polymer | | | | | | | | | | | Storage |
|---|---|---|---|---|---|---|---|---|---|---|---|---|
| Run No. | Refractive index | Abbe's number | Hardness | Specific gravity | Resistance to yellowing under heat | Light resistance | Dyeability (%) | Hard coating property | Impact resistance | Odor | Surface smoothness | Mold-releaseability | stability of polymerizable composition |
| III-1 | 1.592 | 34 | 110 | 1.19 | 0.25 | 0.88 | 67 | A | 96 | 5 | A | 10 | A |
| III-2 | 1.592 | 34 | 110 | 1.19 | 0.25 | 0.85 | 67 | A | 96 | 5 | A | 10 | A |
| III-3 | 1.592 | 34 | 110 | 1.19 | 0.25 | 0.78 | 67 | A | 96 | 5 | A | 10 | A |
| III-4 | 1.592 | 34 | 110 | 1.19 | 0.25 | 0.67 | 67 | A | 96 | 5 | A | 10 | A |
| III-5 | 1.597 | 33 | 109 | 1.19 | 0.27 | 0.78 | 68 | A | 96 | 5 | A | 10 | A |
| III-6 | 1.592 | 34 | 110 | 1.19 | 0.25 | 0.78 | 68 | A | 96 | 5 | A | 10 | A |
| III-7 | 1.595 | 34 | 108 | 1.19 | 0.24 | 0.78 | 65 | A | 96 | 5 | A | 10 | A |
| III-8 | 1.590 | 34 | 108 | 1.18 | 0.24 | 0.78 | 70 | A | 96 | 4 | A | 10 | A |
| III-9 | 1.590 | 34 | 108 | 1.18 | 0.25 | 0.78 | 71 | A | 96 | 4 | A | 10 | A |
| III-10 | 1.592 | 34 | 110 | 1.19 | 0.25 | 0.85 | 67 | A | 96 | 5 | A | 10 | A |
| III-11 | 1.592 | 34 | 110 | 1.19 | 0.25 | 0.78 | 67 | A | 96 | 5 | A | 10 | A |

TABLE 3-1-continued

| | | | | | | | | | | | | | |
|---|---|---|---|---|---|---|---|---|---|---|---|---|---|
| III-12 | 1.592 | 34 | 110 | 1.19 | 0.25 | 0.67 | 67 | A | 96 | 5 | A | 10 | A |
| III-13 | 1.592 | 34 | 110 | 1.19 | 0.25 | 0.78 | 67 | A | 96 | 5 | A | 10 | A |
| III-14 | 1.592 | 34 | 110 | 1.19 | 0.25 | 0.67 | 67 | A | 96 | 5 | A | 10 | A |
| III-15 | 1.592 | 34 | 110 | 1.19 | 0.25 | 0.78 | 67 | A | 96 | 5 | A | 10 | A |

TABLE 3-2

| Run No. | Monomer composition (parts by weight) | | | | | |
|---|---|---|---|---|---|---|
| | Vinylbenzyl compound | DPMP | Comonomer (1) | Comonomer (2) | Mercapto compound | phenol |
| III-16 | VBE (100) | (1) | UA-HTP1 (10) | HEMA (10) | PETP (25) | TGTP (0.3) |
| III-17 | " | " | " | " | " | TGTP (1.0) |
| III-18 | " | " | " | " | " | SGDP (0.3) |
| III-19 | " | " | " | " | " | SGDP (1.0) |
| III-20 | " | " | " | " | " | THMB (0.3) |
| III-21 | " | " | " | " | " | THMB (1.0) |
| III-22 | " | " | " | GMA (10) | " | PTHP (0.3) |
| III-23 | " | " | " | α-MeSt (10) | " | " |
| III-24 | " | " | " | St (10) | " | " |
| III-25 | " | " | UA-HTP2 (10) | HEMA (10) | " | THBI (0.3) |
| III-26 | " | " | 14G (10) | " | " | DHMB (0.3) |
| III-27 | " | " | UA-GX3 (10) | " | " | THBI (0.3) |
| III-28 | " | " | UA-GXE (10) | " | " | DHMB (0.3) |
| III-29 | VOSE (100) | " | UA-HTP1 (10) | " | " | PTHP (0.3) |
| III-30 | VPE (100) | " | " | " | " | " |
| III-31 | VBES (100) | " | " | " | " | " |

| Run No. | Physical properties of the polymer | | | | | | | | | | | Storage stability of polymerizable composition |
|---|---|---|---|---|---|---|---|---|---|---|---|---|
| | Refractive index | Abbe's number | Hardness | Specific gravity | Resistance to yellowing under heat | Light resistance | Dyeability (%) | Hard coating property | Impact resistance | Odor | Surface smoothness | Mold-releaseability | |
| III-16 | 1.592 | 34 | 110 | 1.19 | 0.25 | 0.67 | 67 | A | 96 | 5 | A | 10 | A |
| III-17 | 1.592 | 34 | 110 | 1.19 | 0,25 | 0.78 | 67 | A | 96 | 5 | A | 10 | A |
| III-18 | 1.592 | 34 | 110 | 1.19 | 0.25 | 0.67 | 67 | A | 96 | 5 | A | 10 | A |
| III-19 | 1.592 | 34 | 110 | 1.19 | 0.25 | 0.78 | 67 | A | 96 | 5 | A | 10 | A |
| III-20 | 1.592 | 34 | 110 | 1.19 | 0.25 | 0.67 | 67 | A | 96 | 5 | A | 10 | A |
| III-21 | 1.592 | 34 | 110 | 1.19 | 0.25 | 0.78 | 67 | A | 96 | 5 | A | 10 | A |
| III-22 | 1.592 | 34 | 110 | 1.19 | 0.24 | 0.65 | 67 | A | 96 | 5 | A | 10 | A |
| III-23 | 1.592 | 34 | 110 | 1.19 | 0.24 | 0.65 | 67 | A | 96 | 5 | A | 10 | A |
| III-24 | 1.595 | 34 | 110 | 1.19 | 0.24 | 0.65 | 67 | A | 96 | 5 | A | 10 | A |
| III-25 | 1.595 | 34 | 110 | 1.19 | 0.27 | 0.64 | 67 | A | 96 | 5 | A | 10 | A |
| III-26 | 1.592 | 34 | 107 | 1.19 | 0.26 | 0.63 | 70 | A | 80 | 5 | A | 10 | A |
| III-27 | 1.593 | 34 | 110 | 1.19 | 0.27 | 0.64 | 67 | A | 96 | 5 | A | 10 | A |
| III-28 | 1.595 | 34 | 109 | 1.19 | 0.25 | 0.63 | 67 | A | 96 | 5 | A | 10 | A |
| III-29 | 1.610 | 32 | 105 | 1.19 | 0.25 | 0.62 | 73 | A | 96 | 5 | A | 10 | A |
| III-30 | 1.613 | 32 | 108 | 1.18 | 0.25 | 0.65 | 66 | A | 96 | 5 | A | 10 | A |
| III-31 | 1.605 | 32 | 100 | 1.21 | 0.25 | 0.63 | 78 | A | 96 | 5 | A | 10 | A |

EXAMPLE IV

A vinylbenzyl compound shown in Table 4, DPMP, optional copolymerizable comonomer(s), an optional mercapto compound. a photo-polymerization initiator and 0.1 part by weight of PTHP as a hindered phenol compound were mixed to obtain a photopolymerizable composition. Photo-polymerizable compositions in Run Nos. 1 to 19 were obtained in the above manner. Table 4 shows the storage stability of each photo-polymerizable composition. Each of the photo-polymerizable compositions was respectively cast into a mold formed of glass plates and gaskets of an ethylene-vinyl acetate copolymer to carry out the photopolymerization. The photo-polymerization was carried out by irradiation both surfaces of each photo-polymerizable composition with light at 1.5 kW from a metal halide lamp supplied by Matsushita Electric Works at an irradiation distance of 30 cm in a Panacure NUX41152SF supplied by Matsushita Electric Works, Ltd. The so-obtained polymers were measured for properties in the same manner as in Example I, and Table 4 shows the results. All the polymers in Run Nos. 1 to 19, shown in Table 4, had transparent appearances.

In Table 4, all the Run Nos. 1 to 19 correspond to Examples of the present invention.

TABLE 4

| Run No. | Vinylbenzyl compound | DPMP | Comonomer (1) | Comonomer (2) | Mercapto compound | Photopoly- merization initiator |
|---|---|---|---|---|---|---|
| IV-1 | VOSE (100) | (1) | — | — | — | HCPK (0.3) |
| IV-2 | " | " | — | — | — | TMDPO (0.3) |
| IV-3 | " | " | UA-HTP1 (10) | — | — | HCPK (0.3) |
| IV-4 | " | " | " | — | — | TMDPO (0.3) |
| IV-5 | VBE (100) | " | " | HEMA (10) | — | HCPK (0.3) |
| IV-6 | " | " | 9G (10) | " | — | " |
| IV-7 | " | " | UA-HTP1 (10) | " | PETP (25) | HCPK (0.1) |
| IV-8 | " | " | " | " | " | HCPK (0.3) |
| IV-9 | " | " | " | " | " | TMDPO (0.1) |
| IV-10 | " | " | " | " | " | TMDPO (0.3) |
| IV-11 | " | " | " | " | TETP (25) | HCPK (0.3) |
| IV-12 | " | " | " | " | PETG (25) | " |
| IV-13 | " | " | " | " | TPTP (25) | " |
| IV-14 | " | " | " | " | BDTP (25) | " |
| IV-15 | " | " | " | " | BDTG (25) | " |
| IV-16 | " | " | " | " | PETP (25) | PHMP (0.1) |
| IV-17 | " | " | " | " | " | PHMP (0.3) |
| IV-18 | " | " | " | " | " | MPG (0.1) |
| IV-19 | " | " | " | " | " | MPG (0.3) |

| Run No. | Refrac- tive index | Abbe's number | Hard- ness | Specific gravity | Resistance to yellowing under heat | Light resist- ance | Dye- ability (%) | Hard coating property | Impact resist- ance | Odor | Surface smooth- ness | Mold- re- lease- ability | Storage stability of poly- merizable composition |
|---|---|---|---|---|---|---|---|---|---|---|---|---|---|
| IV-1 | 1.625 | 29 | 115 | 1.15 | 0.20 | 0.93 | 13 | A | 32 | 5 | A | 10 | A |
| IV-2 | 1.625 | 29 | 115 | 1.15 | 0.23 | 0.68 | 15 | A | 32 | 5 | A | 10 | A |
| IV-3 | 1.616 | 31 | 111 | 1.16 | 0.24 | 0.80 | 45 | A | 80 | 5 | A | 10 | A |
| IV-4 | 1.616 | 31 | 109 | 1.16 | 0.27 | 0.90 | 42 | A | 80 | 5 | A | 10 | A |
| IV-5 | 1.582 | 35 | 113 | 1.15 | 0.13 | 0.89 | 45 | A | 80 | 5 | A | 10 | A |
| IV-6 | 1.588 | 34 | 115 | 1.15 | 0.15 | 0.90 | 41 | A | 64 | 5 | A | 10 | A |
| IV-7 | 1.592 | 34 | 110 | 1.19 | 0.25 | 0.90 | 70 | A | 96 | 5 | A | 10 | A |
| IV-8 | 1.592 | 34 | 110 | 1.19 | 0.25 | 0.91 | 72 | A | 96 | 5 | A | 10 | A |
| IV-9 | 1.592 | 34 | 110 | 1.19 | 0.25 | 0.82 | 68 | A | 96 | 5 | A | 10 | A |
| IV-10 | 1.592 | 34 | 110 | 1.19 | 0.25 | 0.80 | 63 | A | 96 | 5 | A | 10 | A |
| IV-11 | 1.597 | 33 | 109 | 1.19 | 0.27 | 0.90 | 68 | A | 96 | 5 | A | 10 | A |
| IV-12 | 1.592 | 34 | 110 | 1.19 | 0.25 | 0.89 | 66 | A | 96 | 5 | A | 10 | A |
| IV-13 | 1.595 | 34 | 108 | 1.19 | 0.24 | 0.90 | 67 | A | 96 | 5 | A | 10 | A |
| IV-14 | 1.590 | 34 | 108 | 1.18 | 0.24 | 0.90 | 70 | A | 96 | 4 | A | 10 | A |
| IV-15 | 1.590 | 34 | 108 | 1.18 | 0.25 | 0.88 | 71 | A | 96 | 4 | A | 10 | A |
| IV-16 | 1.592 | 34 | 110 | 1.19 | 0.25 | 0.85 | 65 | A | 96 | 5 | A | 10 | A |
| IV-17 | 1.592 | 34 | 110 | 1.19 | 0.25 | 0.78 | 68 | A | 96 | 5 | A | 10 | A |
| IV-18 | 1.592 | 34 | 110 | 1.19 | 0.25 | 0.67 | 67 | A | 96 | 5 | A | 10 | A |
| IV-19 | 1.592 | 34 | 110 | 1.19 | 0.25 | 0.78 | 66 | A | 96 | 5 | A | 10 | A |

What is claimed is:

1. A polymerizable composition containing;

(A) 100 parts by weight of a vinylbenzyl compound of the formula (I),

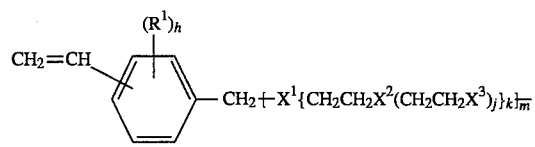

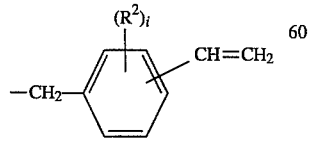

wherein each of $R^1$ and $R^2$ is independently a halogen atom, each of h and i is independently 0, 1 or 2, each of $X^1$, $X^2$ and $X^3$ is independently an oxygen atom or a sulfur atom, and each of j, k and m is 0 or 1, provided that when k is 0, j is 0, that when m is 0, each of j and k is 0, that when j is 0 and when each of k and m is 1, $X^1$ and $X^2$ cannot be sulfur atoms at the same time, and that when each of m, k and j is 1, $X^1$, $X^2$ and $X^3$ cannot be sulfur atoms at the same time, and (B) 0.1 to 20 parts by weight of 2,4-diphenyl-4-methyl-1-pentene.

2. The composition of claim 1, which further contains;

(C) 1 to 50 parts by weight of a mercapto compound having at least two mercapto groups in the molecule.

3. The composition of claim 1, which further contains;

(C) 1 to 50 parts by weight of a mercapto compound having at least two mercapto groups in the molecule, and (D) 1 to 150 parts by weight of other monomer copolymerizable with (A) and (B) components.

4. The composition of claim 1, which further contains;

(C) 1 to 50 parts by weight of a mercapto compound having at least two mercapto groups in the molecule, (D) 1 to 150 parts by weight of other monomer copolymerizable with (A) and (B) components, and (E) 0.01 to 10 parts by weight of a polymerization initiator.

5. The composition of claim 1, which further contains;

(C) 1 to 50 parts by weight of a mercapto compound having at least two mercapto groups in the molecule, (D) 1 to 150 parts by weight of other monomer copolymerizable with (A) and (B) components, (E) 0.01 to 10 parts by weight of a polymerization initiator, and (F) 0.005 to 2.0 parts by weight of a hindered phenol compound.

6. The composition of claim 1, which further contains;

(D) 1 to 150 parts by weight of other monomer copolymerizable with (A) and (B) components.

7. The composition of claim 1, which further contains;

(D) 1 to 150 parts by weight of other monomer copolymerizable with (A) and (B) components, and (E) 0.01 to 10 parts by weight of a polymerization initiator.

8. The composition of claim 1, which further contains;

(D) 1 to 150 parts by weight of other monomer copolymerizable with (A) and (B) components, (E) 0.01 to 10 parts by weight of a polymerization initiator, and (F) 0.005 to 2.0 parts by weight of a hindered phenol compound.

9. The composition of claim 1, where in the vinylbenzyl compound as component (A) is at least one compound selected from the group consisting of 1,2-(vinylphenyl)ethane, bis(vinylbenzyl)ether, bis(vinylbenzyl)sulfide, bis(vinylbenzyloxy)ethane, (1-vinylbenzyloxy-2-vinylbenzylthio)ethane, bis(vinylbenzyloxyethyl)ether and bis(vinylbenzyloxyethyl)sulfide.

10. The composition of claim 2 wherein the mercapto compound as (C) component is a compound of the formula (II-a),

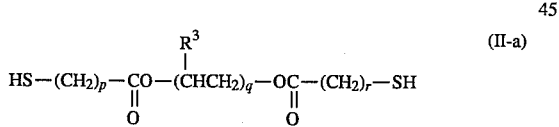

wherein $R^3$ is a hydrogen atom or a methyl group, each of p and r is independently 1 or 2, and q is an integer of 1 to 5, preferably 1 to 3, or the formula (II-b), $(R^4)_lC—[CH_2OOC(CH_2)_pSH]_{4-l}$ (II-b)

wherein $R^4$ is a methyl or ethyl group, p is 1 or 2, and l is 0 or 1.

11. The composition of claim 3 wherein other monomer as (D) component is a compound having at least one vinyl, acryloyl, methacryloyl or allyl group in the molecule.

12. The composition of claim 11, wherein the (D) component contains a diacrylate compound, a dimethacrylate compound or a urethane (meth)acrylate compound having a urethane bond and a plurality of acryloyl or methacryloyl groups.

13. The composition of claim 11, wherein the (D) component contains (meth)acrylate, glycidyl methacrylate, α-methylstyrene or epoxy (meth)acrylate.

14. The composition of claim 12, wherein the diacrylate compound and the dimethacrylate compound have the formula of

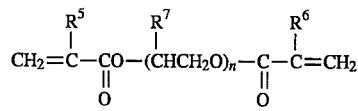

wherein each of $R^5$, $R^6$ and $R^7$ is independently a hydrogen atom or a methyl group, and n is an integer of 1 or more.

15. The composition of claim 12, wherein the urethane (meth)acrylate compound has the formula of

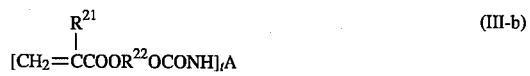

wherein $R^{21}$ is a hydrogen atom or an alkyl group, $R^{22}$ is an alkylene group optionally substituted with an acryloyloxymethyl group or a methacryloyloxymethyl group, t is an integer of 2, 3 or 4, and A is a group of the formula of $—(R^{23}NHCOOR^{24}CONH)_uR^{25}$ when t is 2 or a group of the formula of $\{—(R^{23}NHCOOR^{24})_u\}_vR^{26}$ when t is 3 or 4 in which each of $R^{23}$, $R^{24}$ and $R^{25}$ is independently an alkylene group, a group of the formula of

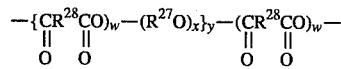

or

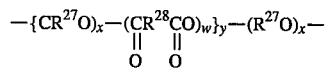

in which each of $R^{27}$ and $R^{28}$ is independently an alkylene or arylene group, each of w and x is independently 0 or 1 and y is an integer of 1 to 10, or a group of the formula of

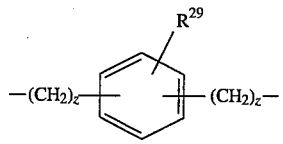

in which $R^{29}$ is a hydrogen atom, a halogen atom or an alkyl group and each of z's is independently an integer of 0 to 8, $R^{26}$ is a trivalent or tetravalent hydrocarbon moiety, u is an integer of 0 to 10, and v is the number of groups bonding to $R^{26}$ which number is an integer of 3 or 4.

16. The composition of claim 4 and 8, wherein the (E) polymerization initiator is a radical polymerization initiator.

17. The composition of claim 16, wherein the radical polymerization initiator is an azo compound of which 10 hours half-life decomposition temperature is 60° C. or lower in toluene.

18. The composition of claim 17, wherein the azo compound is 2,2'-azobis(4-methoxy-2,4-dimethylvaleronitrile), 2,2'-azobis(2-cyclopropylpropionitrile) or 2,2'-azobis(2,4-dimethylvaleronitrile).

19. The composition of claim 5, wherein the (F) hindered phenol compound has the formula (IV),

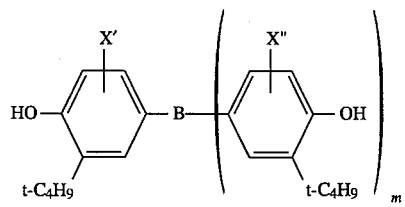
(IV)

wherein each of X' and X" is independently CH$_3$ or t-C$_4$H$_9$, m is 0, 1, 2 or 3, and B is

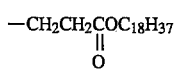

when m=1, any one of

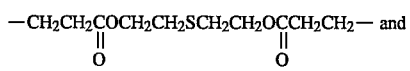

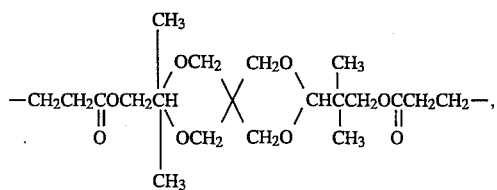

when m=1, any one of

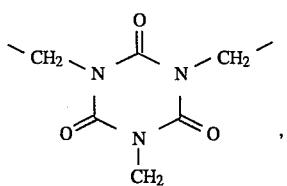

when m=2, or

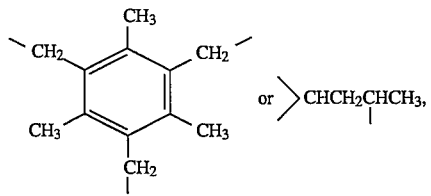

when m=3.

20. A molded article of a cured polymer formed by crosslink-polymerization of the polymerizable composition as recited in claim 1.

21. An organic glass formed of the molded article of a cured polymer as recited in claim 20.

22. An ophthalmic lens formed of the molded article of a cured polymer as recited in claim 20.

* * * * *